United States Patent [19]

Hargreaves

[11] Patent Number: 5,044,539
[45] Date of Patent: Sep. 3, 1991

[54] APPARATUS FOR AFFIXING FASTENERS TO A CONVEYOR BELT

[75] Inventor: Arthur Hargreaves, Blackburn, England

[73] Assignee: J. H. Fenner & Company Limited, North Humberside, England

[21] Appl. No.: 489,913

[22] Filed: Mar. 7, 1990

[30] Foreign Application Priority Data

Mar. 8, 1989 [GB] United Kingdom ............... 8905315

[51] Int. Cl.⁵ .............................................. B25C 7/00
[52] U.S. Cl. ..................................... 227/111; 227/30; 227/110; 29/818; 29/796; 29/791
[58] Field of Search ................. 29/771, 783, 787, 788, 29/791, 795, 796, 798, 809, 818, 251; 227/28, 29, 30, 110, 111

[56] References Cited

U.S. PATENT DOCUMENTS

| | | | |
|---|---|---|---|
| 3,458,099 | 7/1969 | Schick | 227/111 |
| 4,333,217 | 6/1982 | Pray | 227/30 |
| 4,440,336 | 4/1984 | Kifor | 227/111 |
| 4,538,755 | 9/1985 | Schick | 227/30 |
| 4,789,092 | 12/1988 | Schick | 227/111 |

Primary Examiner—P. W. Echols
Assistant Examiner—David P. Bryant
Attorney, Agent, or Firm—Burns, Doane, Swecker & Mathis

[57] ABSTRACT

An apparatus for affixing conveyor belt fasteners (12) to a conveyor belt (10) comprises locating device (54) for locating a plurality of fasteners at equally-spaced intervals with the legs (14, 16) of the fasteners embracing an edge of the belt. A fastener affixing arrangement (30) is movable stepwise by way of an advancing mechanism (118), and is adapted to deform the arms of a fastener onto the belt, to insert a staple (24) through the arms of the fastener and through the belt and to deform the ends of the staple projecting through the belt and through the arms of the fastener. In contrast to prior art devices, the affixing arrangement (30) and the advancing mechanism (118) are driven by an actuating arrangement having an input which is rotatable continuously in one direction in order to operate the apparatus.

14 Claims, 7 Drawing Sheets

United States Patent Office

PTO - BOYERS, PA Duty Station

MISSING PAGE TEMPORARY NOTICE

PATENT # 5044539 FOR ISSUE DATE 9-3-91

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # 3

Data Conversion Operation
Boyers, Pa

APPARATUS FOR AFFIXING FASTENERS TO A CONVEYOR BELT

The present invention relates to apparatus for affixing fasteners to a conveyer belt.

When it is necessary to join together two portions of a conveyer belt (either the two free ends of the belt or two ends of adjacent portions of the belt), it is common to affix a plurality of fasteners each comprising a generally U-shaped bracket, each of which is attached to the belt by means of a metal staple passing through aligned holes in parallel arms of the bracket and also passing through the belt. By affixing a plurality of aligned brackets along the edges of the two portions to be joined, a longitudinal passage is formed by each set of brackets, whereby the edges of the two belt portions may be joined by inserting the fasteners of one edge in-between those of the other, thereby aligning the two passages, and then inserting an elongate securing member into the two aligned passages, thereby securing the two belt portions together.

When affixed, the fasteners comprise two elongate arms interconnected by a U-shaped head portion. Before attachment to the belt, one of the arms is inclined to the other, and during attachment of the fastener this arm is deformed so that it lies parallel to the other arm, thereby gripping the belt between the two parallel arms and allowing the staple to be inserted and secured. The usual way of affixing the fasteners is to have an upper die and a lower punch positioned respectively above and below the fastener to be affixed. The die and punch are forced together to deform the inclined arm of the fastener, to insert the arms of the staple through holes in one arm of the fastener and the belt and through holes aligned with the first holes in the other arm of the fastener, and to turn over the two free ends of the staple so that they lie side-by-side, to prevent the free ends of the staple from projecting beyond the level of the fastener. This is carried out in a single pressing operation, rather like the operation of a stapler for stapling together sheets of paper.

However, such securing of fasteners has several disadvantages. Firstly, with a spongy belt, the resiliency of the belt can give rise to deformation of the belt as the staple is inserted through it, and may not result in a fastener which is affixed accurately at the desired position. It has been found that, with conventional apparatus, on a 42 inch (106.68 cm) wide belt, the end fastener can be up to 1 inch (2.54 cm) inward of where it should be, leading to problems when it comes to aligning the fasteners of one portion with the corresponding fasteners of the edge of another portion. Also, in order to achieve the deformation of the fastener and the insertion and folding over of the pins in a single operation, it is necessary to apply a large force to the upper die and lower punch, and this can cause the conveyer belt to be squeezed and can cause the belt to spread laterally, which once again causes problems with misalignment with another set of fasteners. Moreover, it is found that rather than the projecting ends of the pins being turned over, they are sometimes merely crushed longitudinally, but it is found that during operation of the conveyer belt such staples work themselves loose and tend to tear the belt where they are secured, since they are not securely attached to the belt. This results in a shorter working life of the belt joint.

One apparatus which overcomes the aforesaid problems is disclosed in our co-pending application, published as GB 2202605A, in which the apparatus comprises upper and lower portions of an affixing means, in which a fastener deforming and stapling head deforms a fastener and clamps the arms of the fastener onto the belt, whilst simultaneously a corresponding lower die portion inserts a staple through aligned holes in the arms of the fastener. Simultaneously, a staple folder turns over the ends of the staple which have previously undergone the first operation in a previous cycle. Again simultaneously with the two said operations, a third staple which has previously undergone the two other operations in previous cycles has the turned-over ends of the staple pressed towards the fastener by a flattening head. The affixing means is indexed stepwise in steps equal in length to the spacing of the fasteners, whereby each fastener is acted on sequentially by the fastener deforming head, the staple folding head and the staple flattening head as the affixing head is advanced.

The apparatus is operated by means of a cam member which is rotated back and forth through a fixed angle of operation, approximately 95°. This is not a drawback where, as is possible, the apparatus is driven by a fluid-operated ram, but where the apparatus is to be manually powered, the reciprocal operation of the device is not preferred by operators, who must ensure that the cam travels to its fullest extent in each angular direction.

It is thus an object of the present invention to provide an apparatus for securing fasteners onto the edge of a conveyer belt such that the fasteners are securely and safely held in position on the edge of the belt, whilst overcoming the disadvantages associated with manual operation of the apparatus in GB 2202605A.

It is a further object of the present invention to provide an apparatus for affixing fasteners to the edge of a conveyer belt, which is of simpler construction and operation than known devices.

In accordance with a first aspect of the present invention, an apparatus for affixing fasteners each comprising two arms joined by an arcuate portion, to an end of a conveyer belt comprises locating means for locating a plurality of fasteners at substantially equally-spaced intervals with the legs of each fastener embracing an edge of the belt, fastener affixing means adapted to deform the arms of a fastener onto the belt, insert a staple through the arms of the fastener and through the belt located therebetween and deform the ends of the staple projecting through the belt and through the arms of the fastener, and advancing means for advancing the fastener affixing means stepwise, the apparatus further comprising an actuating mechanism for actuating the affixing means and the advancing means, the actuating mechanism having an input which is rotatable continuously in one direction to induce a cycle of operation of the apparatus.

Such an arrangement allows the apparatus to be driven by a shaft which is continuously rotatable in one direction only, rather than being reciprocable through a predetermined angle. This allows simpler operation of the apparatus and results in fewer errors in the affixing of the fasteners.

Advantageously, rotation of the input of the actuating means in one direction induces a plurality of successive cycles of operation of the apparatus. The actuating means preferably includes a camming member, and the camming member may be rotatably mounted on the apparatus, e.g. on a rotatable input shaft.

Preferably, the fastener affixing means comprises an upper die portion and a lower punch portion, each being displaceable by engagement with a respective camming surface. Preferably, the camming surfaces are provided on a single camming member.

Advantageously, the apparatus comprises a rotatable input shaft, and the camming member may be conveniently mounted on the shaft.

The camming member may take the form of a generally planar member arranged with its plane perpendicular to its rotational axis. The camming surfaces may be in the form of respective cam tracks in opposite faces of the camming member.

There may be means for manually rotating the camming member, for example an actuating handle, or there may be provision for rotation of the camming member by externally-driven power means.

In accordance with a second aspect of the present invention, an apparatus for affixing fasteners, each comprising two arms joined by an arcuate portion, to an end of a conveyer belt comprises locating means for locating a plurality of fasteners at substantially equally-spaced intervals with the legs of each fastener embracing an edge of the belt, fastener affixing means for affixing the fasteners to the belt, and advancing means for advancing the fastener affixing means stepwise, the fastener affixing means comprising a displaceable lower punch adapted to force the legs of a two-legged staple through one arm of a fastener and through the belt, and a displaceable upper die having a first die portion located opposite the punch portion for deforming a fastener arm into contact with the belt to enable the fastener arm to receive the legs of the staple forced through the belt by the punch, a second die portion located adjacent the first die portion for deforming the ends of the legs of an adjacent staple previously acted upon by the first die portion, and a third die portion located adjacent the second die portion for pressing down the ends of a staple previously acted upon by the first and second die portions, the advancing means advancing the fastener affixing means stepwise to enable each die portion to act successively on, and thereby secure to the belt, each fastener and its associated staple.

In contrast to the prior art devices, where the staple is inserted and the ends of the staple are turned over in a single operation, the separation of the turning over of the ends of the staple results in a much more accurate securing of the fastener and its associated staple.

Preferably, the three die portions are provided with one or more recesses shaped to receive and/or deform the ends of the staple legs.

In a preferred embodiment, an abutment block is provided opposite the second and third die portions, and is adapted to engage the undersurface of the fastener being acted upon by the second and third die portions.

In accordance with a third aspect of the present invention, a method for affixing fasteners, each comprising two arms joined by an arcuate portion, to an end of a conveyer belt comprises locating a plurality of fasteners at substantially equally-spaced intervals with the legs of each fastener embracing an edge of the belt, forcing the legs of a two-legged staple through one arm of a fastener and through the belt, performing a first operation of deforming a fastener arm into contact with the belt to enable the fastener arm to receive the legs of the staple forced through the belt, performing a second operation of deforming the ends of the legs of an adjacent staple which has previously undergone the first operation, and a third operation of pressing down the ends of a staple previously subjected to the first and second operations, and advancing the fastener affixing means stepwise to perform each operation successively on a plurality of fasteners and their associated staples.

In accordance with a fourth aspect of the present invention, an apparatus for affixing fasteners, each comprising two arms joined by an arcuate portion, to an end of a conveyer belt, comprising locating means for locating a plurality of fasteners at substantially equally-spaced intervals with the legs of each fastener embracing an edge of the belt, fastener affixing means adapted to form the arms of a fastener onto the belt, insert a staple through the arms of the fastener and through the belt located therebetween and deform the ends of the staple projecting through the belt and through the arms of the fastener, and advancing means for advancing the fastener affixing means stepwise, the locating means comprising an elongate member provided with a plurality of receiving apertures, and the fastener affixing means being engaged with and movable along the elongate member forming the locating means, the apparatus further comprising an elongate support member located below the elongate member forming the locating means, and with which the fastener affixing means is in contact.

The provision of a second, lower elongate member for the fastener affixing means takes much of the force, produced during the fastener affixing process, off the locating means, thereby preventing or reducing the deformation of the locating means.

Preferably, the fastener affixing means is slidably disposed on the two said elongate members.

By way of example only, a specific embodiment of the present invention will now be described, with reference to the accompanying drawings, in which:

FIG. 4 is a cross-sectional side elevation of the fastener affixing head of the embodiment of FIG. 3;

Figure 1:
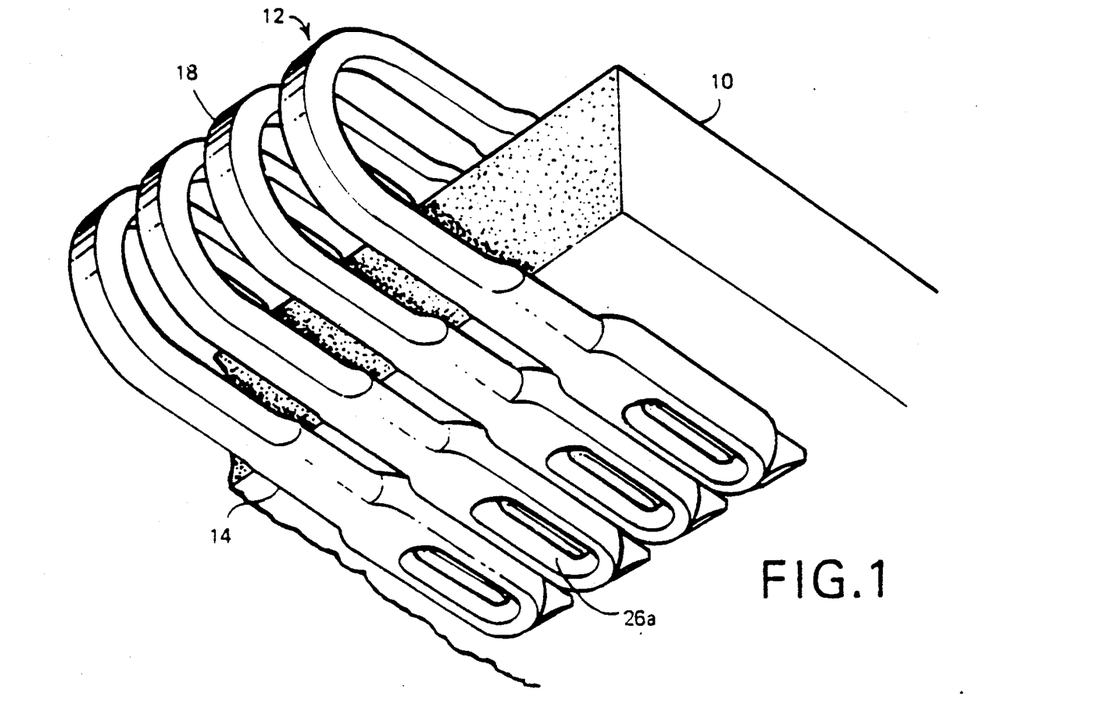
FIG. 1 is a perspective view from below of a portion of one end of a conveyer belt fitted with connecting fasteners.
Figure 2:
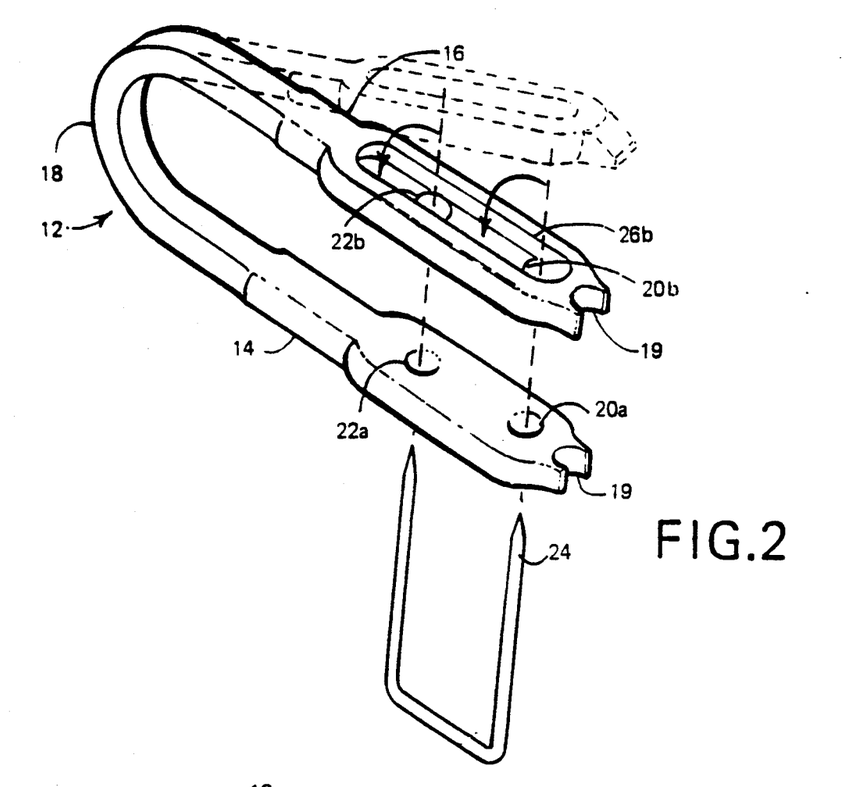
FIG. 2 is an exploded perspective view from above of one of the fasteners of FIG. 1, together with a staple used to secure the fastener to the belt.

Referring firstly to FIGS. 1 and 2, a conventional conveyer belt 10 is cut transversely to its length and is provided with a plurality of fasteners 12 along the transverse edge so formed. The fasteners comprise two legs 14, 16 which are deformed during application of the fasteners to grip the belt 10 therebetween, and a U-shaped head 18 which joins the two legs 14, 16 together. The free ends of the legs 14, 16 are widened and provided with respective outer 20a, 20b and inner 22a, 22b aligned holes, whereby the legs of a staple 24 may be passed through the aligned holes and its free ends deformed, in the direction of the arrows in FIG. 2, to secure the staple of the fastener. The widened ends of the legs 14, 16 are also provided with recesses 26a, 26b to accommodate the head and free ends respectively of the staple. The free ends of each of the staple legs 14, 16 are also provided with locating recesses 19, as will be explained later.

Figure 3:
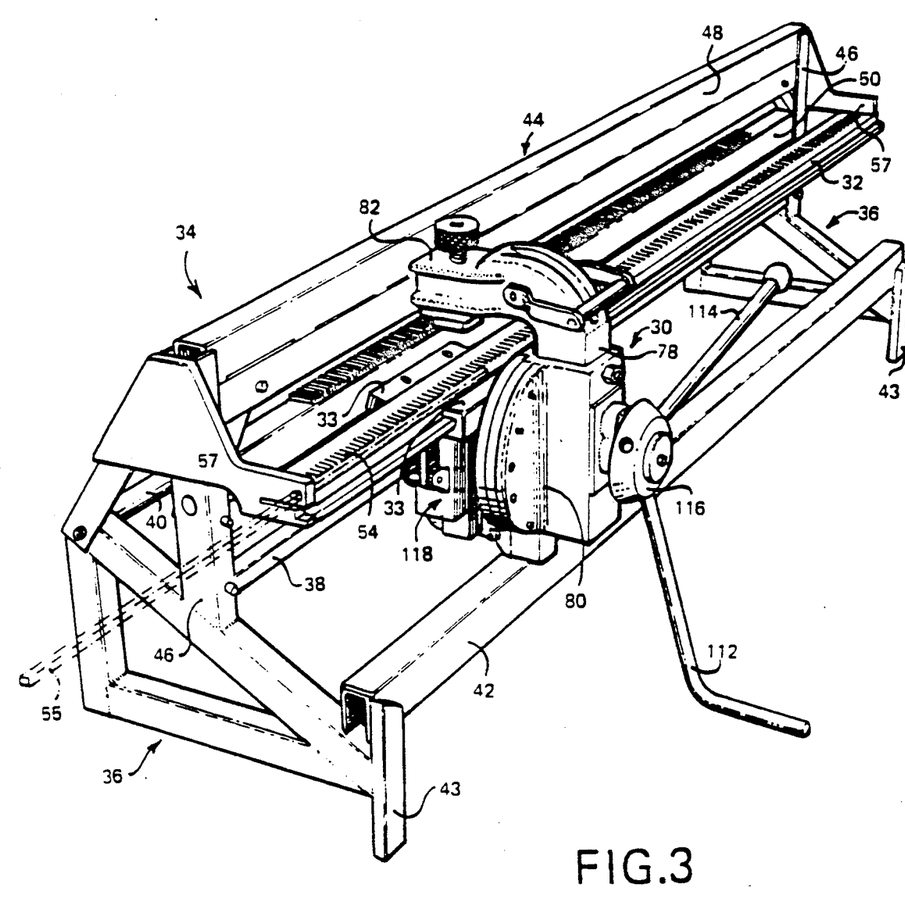
FIG. 3 is a perspective view of an embodiment of apparatus for affixing fasteners to a conveyer belt, in accordance with the present invention.

An apparatus for securing the fasteners to the belt is shown in FIG. 3, and comprises a fastener affixing head 30 which is slidable along an elongate guide member 32 of a mounting frame 34. The frame additionally comprises two triangular end frame portions 36 interconnected by two elongate bars 38, 40, and by a further skid bar 42, extending between two feet 43 connected to respective triangular end frame portions, and along which the fastener affixing head is slidable. A belt clamping arrangement 44 is mounted on two vertical channel-section support members 46 attached to the triangular frame portions 36, and by means of a screw-threaded jack arrangement (not shown) is able to clamp a belt in a desired position with respect to the frame, between the lower surface of an elongate clamping member 48 whose ends are movable in the channels in the vertical support members 46 and a toothed bar 50 which is fixedly attached between the support members 46.

Referring to FIG. 4, the belt clamping arrangement 44 is adapted to secure the belt 10 with the lower surface of the belt above the upper surface of the elongate guide member 32 along which the fastener affixing head 30 is slidable by means of two runners 33 having grooves which receive respective elongate ribs 32a of the guide member 32. The elongate guide member is provided with a plurality of apertures 54 spaced 8 mm apart from each other and extending through the member connecting its two faces. Each aperture is adapted to receive and hold as a press fit the head of a staple 24 with its two parallel arms pointing upwardly, and with the ends of the arms of the staple inserted and held in respective recesses 20a, 22a, in the lower arm of the associated fastener. In use, a plurality of such fastener/staple combinations is provided on an elongate self-adhesive strip, at the same spacing as the apertures 54, so that a plurality of fastener/staple combinations can be located rapidly and conveniently on the elongate frame member 32. As can be seen from FIG. 4, when the staples are located in their associated apertures 54, the lower arm 14 of each fastener lies in contact with the upper surface of the elongate frame member 32, but with the arms 14, 16 of the fastener splayed, as shown In dotted lines in FIG. 2.

The fastener/staple combinations are located on the frame member 32 as aforesaid, for a distance corresponding to the width of the belt. The fasteners are additionally held on the apparatus by passing a bar 55 (shown in chain dot in FIG. 3) through aligned apertures 57 in either end of the frame such that the loop of each fastener abuts the bar. As will be described hereinafter, the fasteners are secured to the bet 10 by forcing the staples through the holes 20a, 22a in the lower arm 14 of the fastener, whilst simultaneously deforming the upper arm 16 of the fastener to bring it parallel to the lower arm, which allows the ends of the staple to be forced through the belt and through the aligned holes 20b, 22b in the upper arm of the fastener. The protruding ends of the staple are then deformed in a second step and are flattened down in a third step. The three steps are carried out simultaneously on three adjacent fastener/staple combinations, and each fastener/staple combination has the three operations carried out sequentially on it as the fastener affixing head moves stepwise along the elongate frame member 32.

The fastener affixing head comprises a three-part upper die portion 56 and a lower punch portion 68. The first part of the upper die portion comprises a metal block 60 having two slots in the form of parallel, elongate staple receiving recesses 60a shaped to receive the ends of the staple legs. The second part comprises a block 62 having two staple receiving recesses 62a which have faces inclined upwardly away from the belt 10 at an angle of 30° to the horizontal (60° to the longitudinal axis of the apertures 60a). The third part comprises a block 64 positioned adjacent to the second block 62, and having one rounded elongate recess 64a for flattening turned over ends of a staple.

The blocks 60, 62 of the fastener affixing head are each provided with two fastener locating lugs 73, 74 for engagement with the correspondingly-shaped recesses 19 in the end of the upper arm of each fastener, thereby correctly centering and positioning the fastener with respect to the belt.

The three-part upper die portion 56 is connected to a die arm 76, extending out of the housing 80 of the fastener affixing head, and which comprises a straight, elongate portion 78 which is slidably disposed in a channel in the housing 80 of the fastener affixing head, and an overhanging portion 82 which overhangs the guide member 32 upon which the fastener affixing head is slidably disposed. A carrying handle 83 is pivotally connected to either side of the overhanging portion 82, and the extent to which the upper die portion 56 projects from the die arm is adjustable by means of a knob 81 which has a shaft which is screw-threadedly received in the die arm and rotatably mounted in the upper die portion 56.

The lower punch portion 68 comprises a punch head 66 positioned opposite the block 60 of the upper die portion 56. The punch head is shaped to receive the head of a staple 24, and is connected to a punch block 68 which is slidably disposed within the fastener affixing head housing 80 and which is biased upwardly by means of a compression spring 70. The punch head 66 is shaped to be able to pass through the apertures 54 in the guide member 32 by movement of the punch block 68. The punch head 66 is only located opposite the block 60 of the upper die portion 56. A metal plate 71 is located opposite the second and third blocks 62, 64 and is clamped in position by means of a releasably securable securing block 72.

In order to affix fasteners to a belt, the upper die head 56 and the lower punch head 66 must be moved together, in order to deform the arms of the fastener, insert the staple and deform the free ends of the staple arms. This movement is achieved as follows.

Figure 6:
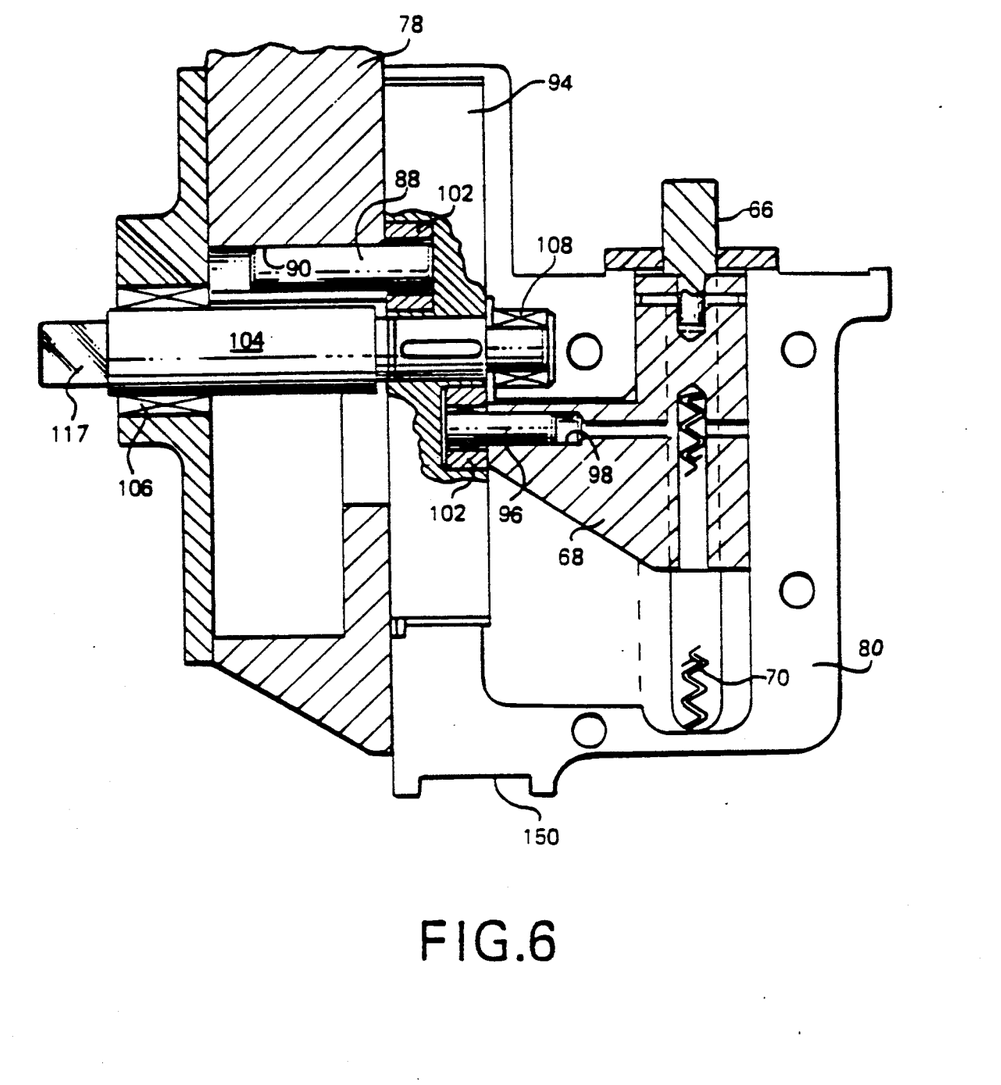
FIG. 6 is a cross-sectional detail side elevation of a portion of the fastener affixing head of FIG. 4.
Figure 8:
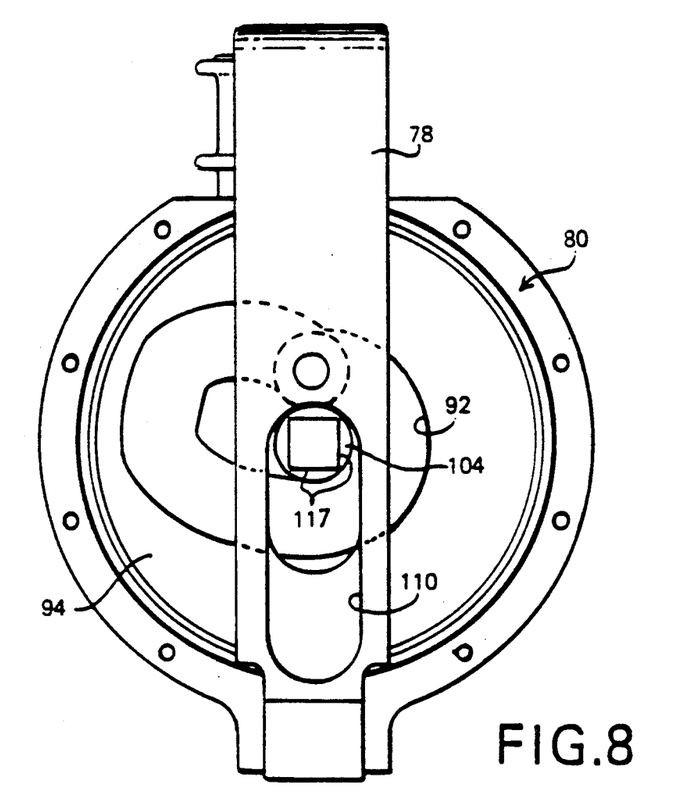
FIG. 8 is a view of a portion of the fastener affixing head, looking in the direction of arrow VIII of FIG. 6, showing one cam track of a cam member.

As best seen in FIGS. 6 and 8, the elongate portion 78 of the die arm is provided with a hardened dowel 88, the main portion of which is located in a corresponding bore 90 in the elongate portion 78 of the die arm, and one end of which is located in a first cam track 92 which is provided in one face of a cam member 94. Similarly, the punch block 68 is provided with a hardened dowel 96 located in a bore 98 in the punch block, and the other end of which is located in a second cam track 100 in the opposite face of the cam member 94. In each case, a bushing 102 is located on the end of the dowels 88, 96 which are seated in the respective cam tracks 92, 100.

The cam member 94 is mounted on an input shaft 104 which is rotatably mounted with respect to the fastener affixing head housing 80 by means of shaft bearings 106, 108. The plane of the cam member 94 is perpendicular to the rotational axis of the shaft 104, and the longitudinal axes of the dowels 88, 96 are parallel to the said rotational axis. The elongate portion 78 of the die arm 76 is provided with a cut-out portion 110, to allow relative movement between the die arm 76 and the shaft 104.

Figure 5:
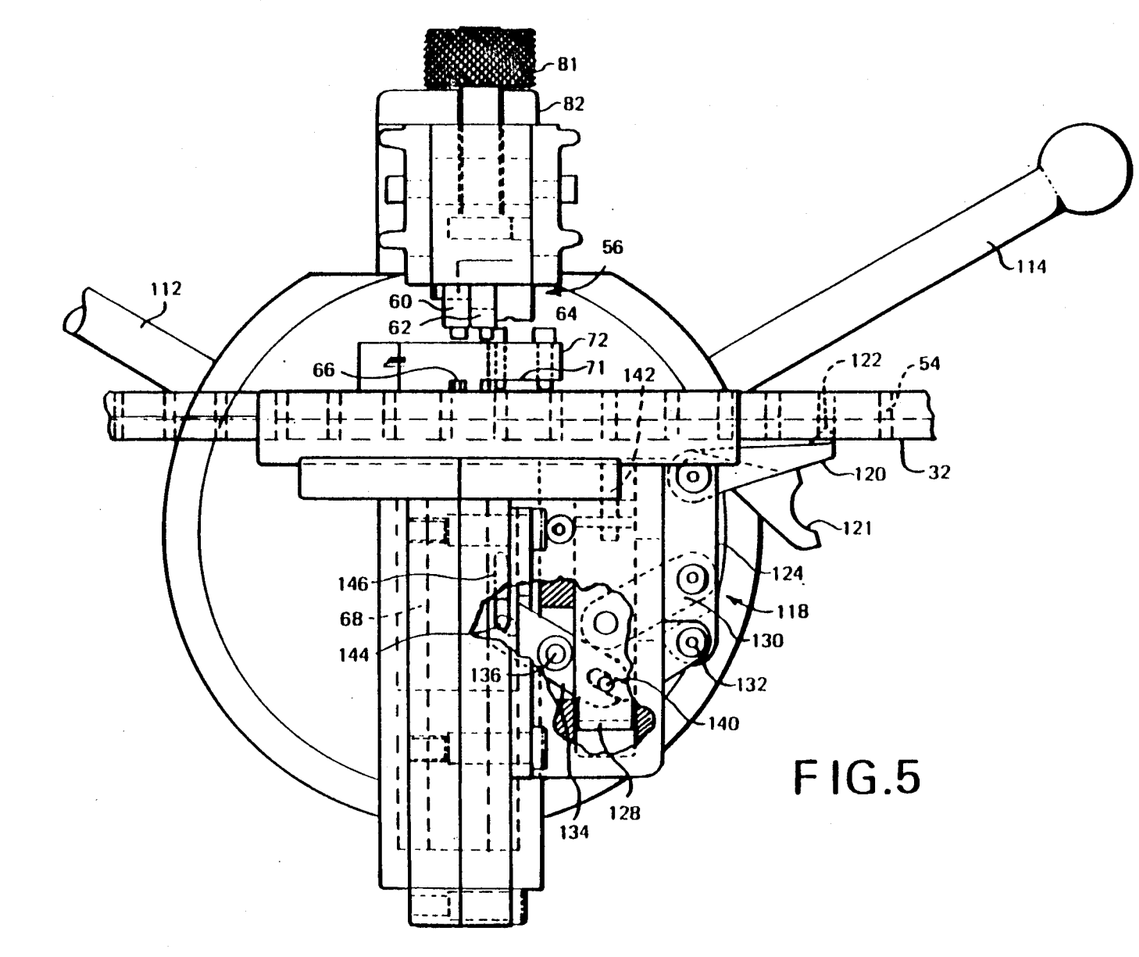
FIG. 5 is a rear elevational view, partly cut away, of the fastener affixing head of FIG. 3.
Figure 9:
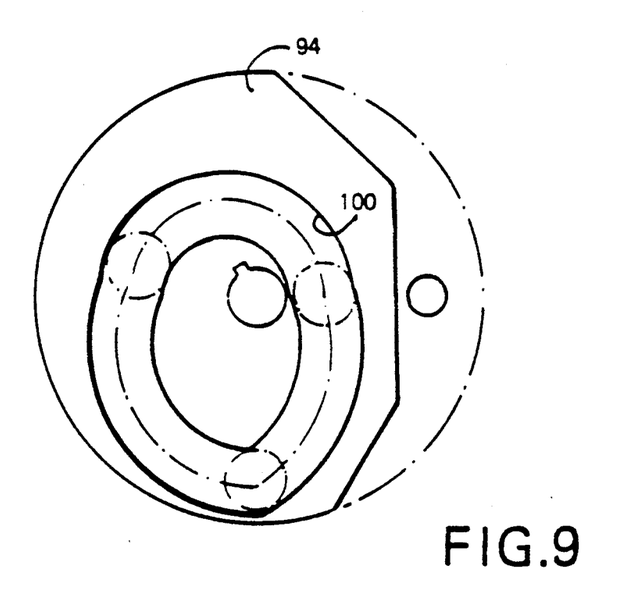
FIG. 9 is a view of the opposite side of the cam member of FIG. 8.

As will be noted from FIGS. 3 to 5, the shaft 104 is rotatable by means of two arms 112, 114 which extend from a hub 116 attachable to flats 117 of the input shaft 104. Alternatively, a power-driven connection may be connected to the flats 118 of the shaft 104. By rotating the input shaft 104 clockwise as seen in FIGS. 3 and 8 (and anticlockwise as seen in FIGS. 5 and 9), the engagement of the dowels 88, 96 in the respective cam tracks 92, 100 of the cam member 94 causes reciprocal motion of the die arm 76 and the punch block 84, since these two items are each constrained to move along a respective single axis only. Thus, as the shaft 104 is rotated by means of the arms 112, 114, the die arm 76 and the punch block 68 are moved towards each other and then away from each other, thereby causing the die head and the punch 66 to produce a clamping action. In this way, and as will be explained in more detail hereinafter, the fasteners are affixed to the belt.

The fastener affixing head is also provided with an indexing and advancing mechanism 118, which is driven indirectly by the rotation of shaft 104. As best seen in FIG. 5, the mechanism comprises a pivotally mounted advancing arm 120 having a nose 122 which is engageable with the bottom opening of each of the apertures 54 in the guide member 32. The advancing arm 120 is pivotally mounted on a first member 124 of a link mechanism, and is biased upwardly into engagement with the apertures 54 of the guide member 32 by means of a torsion spring 126 (FIG. 4). The nose is disengageable from a recess 54 by means of an attached finger lug 121 having a cutout portion shaped to receive a finger which is used to pivot the arm against the force of the spring 126. The first member 124 itself is pivotally mounted at its opposite end to the fastener affixing head by means of a pivot pin 132. A second member 128 of the linkage is constrained to move along an axis parallel to the axis of movement of the punch head 66. A linkage arm 130 is pivotally connected to each of the members 124, 128 of the linkage mechanism.

The member 128 is reciprocable along its movement axis by means of a driving link 134 which is pivotally attached about its centre point 136 to the housing of the advancing mechanism 118. Each of the ends of the driving link 134 is provided with a longitudinal slot which is parallel to the longitudinal direction of the link 134. One of the recesses is engageable with a lug 140 disposed on the reciprocable member 128. It should also be noted that the opposite end of the reciprocable member 128 is provided with a tapered locating nose 142, which is adapted to engage in the through apertures 54, as will be explained.

The recess in the opposite end of the pivot link 134 engages with a hardened dowel 144, whose ends are located in two elongate tracks 146 in side walls of the punch block 68, the pivot link 134 engaging with the centre of the dowel 144 and passing through an aperture provided in the punch block 68 for that purpose. It will be noted that there is a lost motion connection between the punch block 68 and the driving link 134, in that as the punch 68 moves downwards as shown in FIG. 5, the dowel 144 will not be moved downwards until it connects the upper end of the two apertures 146 provided in the punch block 68.

In the position illustrated in FIG. 5, the punch block is at its uppermost position. As the shaft 104 is rotated, the engagement of the dowels 88 and 96 of the die arm 76 and the punch block 68 with their respective cam tracks in the cam member 94 cause the die arm to move upwardly and the punch block to move downwardly. As the punch block moves downwardly, the punch head 66 is withdrawn from its aperture 54, and eventually the ends of the apertures 146 contact the hardened dowel 144, and cause the left-hand end of the pivot arm 134 (as seen in FIG. 5) to move downwardly, thereby forcing up the reciprocal member 128. The upward motion of the reciprocal member 128, and the pivotal connection of the linkage arm 130 causes the first link 124 to pivot outwardly about its pivot 132 which in turn causes the advancing arm 120 to be forced outwardly, thereby pushing the head along the guide member 32 by virtue of the engagement between the nose 122 and an aperture 54. Further downward movement of the punch block 68, resulting in further upward movement of the reciprocal member 128, results in a total movement equal to the spacing of the apertures 54, and causes the tapered located nose 142 extending from the reciprocal member 128 to engage in an aperture 54, and thereby securely locate the fastener affixing head with respect to the guide 32. The tapering of the head 142 ensures that the fastener is correctly located even if it is slightly out of position initially.

Further rotation of the shaft 104 causes the die arm and the punch block to move in the opposite direction, such that the die block and the punch move together in a clamping action. During this reverse motion of the die arm and the punch block, the locating peg 142 initially rests in its associated aperture 54, as a result of the lost motion action, due to the apertures 146 in the punch block 68. However, once the punch block has moved a sufficient distance for the punch head to engage the head of a staple and pass into the associated aperture, the lost motion is no longer effective, and the further upward motion of the punch block 68 results in a downward motion of the push link 128, and disengagement of the locating nose 142 from its associated aperture 54, resulting in a position as shown in FIG. 5. However, at that point in the cycle, the punch head will provide a firm locating action, due to its engagement with an aperture 54. This further movement also pivots the arm 124 inwardly, which draws the arm 120 inwardly, pulling the nose 122 out of engagement with its aperture. However, the inward movement of the arm 120 and the spring 126 cause the nose 122 to engage with the next aperture along the guide 32. The cycle then repeats.

It will also be noted from FIG. 4 that the base of the affixing head housing is provided with a recess 150 which is adapted to receive the skid bar 42, such that the fastener head slides along both the guide bar 32 and the skid bar 42. The advantage of this is that during the securing operation considerable forces are produced on the head which, in the absence of the skid bar 42 would be borne solely by the guide bar 32, and might cause deformation thereof. This is undesirable, since the guide bar 32 is required for accurate location of the fasteners and staples and of the head with respect to the fasteners and staples. The largest forces are downward forces produced during the staple insertion, but the skid bar 42 bears much of the applied force and relieves the forces on the guide bar 32.

Figure 7A:
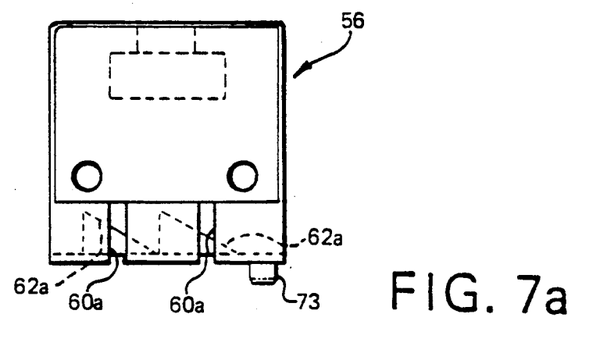
FIGS. 7a and 7b are side and front elevational views respectively of a die portion of the fastener affixing apparatus of FIG. 3.
Figure 7B:
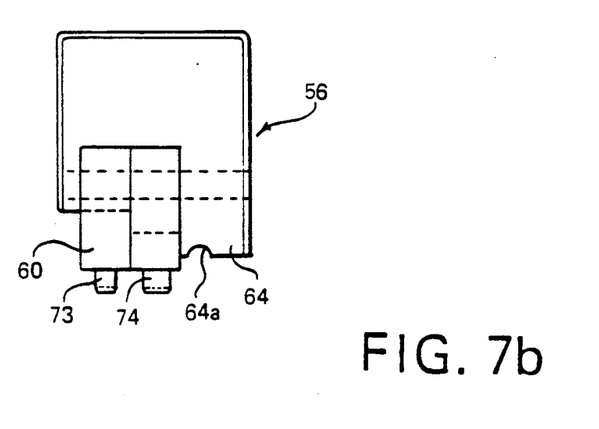

It will be noted from FIGS. 5 and 7 that during each clamping action of the die block and the punch, three fasteners are acted upon. The first action is on an aperture whose arms diverge, and in this case the peg 72 engages with the correspondingly shaped recess 19 in the upper arm of the fastener, thereby centering and correctly positioning the fastener. The further movement of the die block and the punch together causes the upper arm to be deformed parallel to the lower arm, and also punches the staple through the aligned apertures. After the staple arms have passed through the apertures in the upper arm, which is by this time parallel to the lower arm, the ends of the staple arms are received in the elongate apertures 60a in the first portion 60 of the die block. Simultaneously, a second action takes place on the adjacent staple, which during the previous cycle has had the aforementioned first step carried out upon it. The second step involves the downward movement of the second block of the die head such that the previously straight staple heads are bent over by the second inclined recesses 62a. In this second action, the punch 66 does not take part, but rather the staple is squeezed between the moving die head and the plate 71 which is fixed relative to the fastener affixing head as a whole.

Simultaneously, a third step is being carried out on a staple which during the previous two cycles has had the first and second operations respectively carried out on it. The third operation is to flatten down the bent over staple ends of the staple, and for this purpose a recess is provided in the third part of the die head. Again, the punch 66 takes no part in this action, but rather a squeezing action occurs between the third portion of the die head and the plate 71 which is fixed generally with respect to the fastener affixing head.

Thus, it will seen that during each cycle (which is achieved by one complete rotation of the shaft 104) three fastener/staple combinations are acted upon in three separate operations.

I claim:

1. An apparatus for affixing fasteners, each comprising two arms Joined by an arcuate portion, to an end of a conveyor belt, comprising:
    locating means for locating a plurality of said fasteners at substantially equally-spaced intervals, with the legs of each of said fasteners embracing an edge of said conveyor belt;
    fastener affixing means for deforming the arms of a fastener onto said belt, for inserting a staple through the arms of said fastener and through said belt located between said arms and for deforming the ends of said staple projecting through said belt and through the arms of said fastener;
    advancing means for advancing said fastener affixing means stepwise; and
    an actuating mechanism for actuating said fastener affixing means and said advancing means and having an input shaft which rotates continuously in one direction to induce a cycle of operation of the apparatus.

2. Apparatus as claimed in claim 1, wherein the input shaft of the actuating means is rotatable continuously in one direction to induce a plurality of successive cycles of operation of the apparatus.

3. Apparatus as claimed in claim 1, wherein the actuating means comprises a camming member.

4. Apparatus as claimed in claim 3, wherein the camming member is rotatably mounted on the apparatus.

5. Apparatus as claimed in claim 4, wherein the camming member is mounted upon the input shaft.

6. Apparatus as claimed in claim 3, wherein the fastener affixing means comprises an upper die portion which is displaceable by engagement with a camming surface on the camming member.

7. Apparatus as claimed in claim 3, wherein the fastener affixing means comprises a lower punch portion which is displaceable by engagement with a camming surface in the camming member.

8. Apparatus as claimed in claim 3, wherein the fastener affixing means comprises an upper die portion and a lower punch portion, each being displaceable by engagement with a respective camming surface on a single camming member.

9. Apparatus as claimed in claim 3, wherein the camming member comprises a generally planar member arranged with its plane substantially perpendicular to its rotational axis.

10. Apparatus as claimed in claim 9, comprising camming surfaces in opposite faces of the camming member.

11. Apparatus as claimed in claim 1, comprising means for manually rotating the input shaft of the actuating means.

12. Apparatus as claimed in claim 11, comprising an actuating handle for rotating the input shaft of the actuating means.

13. Apparatus as claimed in claim 1, comprising a facility for rotating the input shaft of the actuating means by externally-driven power means.

14. Apparatus as claimed in claim 1, further comprising an elongate support member located below the fastener locating means, the fastener affixing means, in use, abutting the elongate support member and being movable therealong.

* * * * *